United States Patent
Mathers

(10) Patent No.: US 10,774,966 B2
(45) Date of Patent: Sep. 15, 2020

(54) HYDRAULIC JOINT

(71) Applicant: Steel Safe Fluid Power Pty Ltd, Bridgeman Downs (AU)

(72) Inventor: Norman Ian Mathers, Brisbane (AU)

(73) Assignee: Steel Safe Fluid Power Pty Ltd, Bridgeman Downs (AU)

( * ) Notice: Subject to any disclaimer, the term of this patent is extended or adjusted under 35 U.S.C. 154(b) by 274 days.

(21) Appl. No.: 15/654,418

(22) Filed: Jul. 19, 2017

(65) Prior Publication Data
US 2018/0023738 A1 Jan. 25, 2018

Related U.S. Application Data

(60) Provisional application No. 62/365,573, filed on Jul. 22, 2016, provisional application No. 62/504,816, (Continued)

(51) Int. Cl.
*F16L 27/12* (2006.01)
*F16L 27/053* (2006.01)
(Continued)

(52) U.S. Cl.
CPC ........... *F16L 27/125* (2013.01); *F16L 27/053* (2013.01); *F16L 27/06* (2013.01); *F16L 57/04* (2013.01);
(Continued)

(58) Field of Classification Search
CPC ....... F16L 27/125; F16L 27/053; F16L 27/06; F16L 57/04; F16L 27/042; F16L 27/12;
(Continued)

(56) References Cited

U.S. PATENT DOCUMENTS 2,985,467 A 5/1961 Cable, Jr. et al.
3,149,845 A 9/1964 Knox
(Continued)

FOREIGN PATENT DOCUMENTS

CN 110023667 A 7/2019
EP 0087401 8/1983
(Continued)

OTHER PUBLICATIONS

"International Application Serial No. PCT/AU2017/050744, Written Opinion dated Sep. 29, 2017", 7 pgs.
(Continued)

*Primary Examiner* — Zachary T Dragicevich
*Assistant Examiner* — William S. Choi
(74) *Attorney, Agent, or Firm* — Schwegman Lundberg & Woessner, P.A.

(57) ABSTRACT

Various systems and assemblies that can be utilized with hydraulic and other fluid flow lines are disclosed. According to one embodiment, the present application discloses an assembly that can include a first section, a second section and a third section. The first section can define a first passageway therein to receive and allow for passage of a fluid. The second section can define a second passageway that communicates with the first passageway. The second section and the first section together can form a first ball joint having an internal portion and an external portion. The first ball joint can comprise a moveable coupling between second section and the first section. The third section can define a third passageway that communicates with the second passageway. The third section can telescopically receive the second section therein and can be configured to form a linearly moveable joint between the third section and the second section.

19 Claims, 10 Drawing Sheets

Related U.S. Application Data filed on May 11, 2017, provisional application No. 62/529,614, filed on Jul. 7, 2017.

(51) Int. Cl.
*F16L 27/06* (2006.01)
*F16L 57/04* (2006.01)
*G01M 3/28* (2006.01)
*F16L 27/04* (2006.01)

(52) U.S. Cl.
CPC ......... *G01M 3/2853* (2013.01); *F16L 27/042* (2013.01); *F16L 2201/30* (2013.01)

(58) Field of Classification Search
CPC ......... F16L 27/00; F16L 27/04; F16L 27/026; F16L 27/0808; G01M 3/2853
USPC ............ 285/145.3, 13, 14, 51, 121.1, 121.2, 285/121.3, 121.6, 133.11, 133.21, 133.3, 285/138.1, 145.1, 146.3, 261, 264, 276
See application file for complete search history.

(56) References Cited

U.S. PATENT DOCUMENTS

| | | | |
|---|---|---|---|
| 3,929,356 A | | 12/1975 | Devincent et al. |
| 3,944,263 A | * | 3/1976 | Arnold ................ F16L 37/52 |
| | | | 285/261 |
| 5,029,461 A | | 7/1991 | Lawrence et al. |
| 5,551,484 A | | 9/1996 | Charboneau |
| 6,056,329 A | * | 5/2000 | Kitani .................. F16L 27/04 |
| | | | 285/145.3 |
| 2015/0338003 A1 | * | 11/2015 | Saito ..................... F16L 27/04 |
| | | | 285/261 |
| 2016/0178104 A1 | | 6/2016 | Queau et al. |

FOREIGN PATENT DOCUMENTS

| IN | 201917006576 A | 5/2019 |
|---|---|---|
| WO | 2018014082 | 1/2018 |

OTHER PUBLICATIONS

"International Application Serial No. PCT/AU2017/050744, International Search Report dated Sep. 29, 2017", 4 pgs.

"International Application Serial No. PCT AU2017 050744, International Preliminary Report on Patentability dated Jan. 31, 2019", 9 pgs.

* cited by examiner

HYDRAULIC JOINT

PRIORITY CLAIM

This application claims priority to U.S. Provisional Application No. 62/529,614, entitled "HYDRAULIC JOINT," filed Jul. 7, 2017; U.S. Provisional Application No. 62/365,573, entitled "HYDRAULIC JOINT", filed Jul. 22, 2016, and to U.S. Provisional Application No. 62/504,816, entitled "HYDRAULIC JOINT", filed May 11, 2017, the entire specifications of each of which are incorporated herein by reference in their entirety.

TECHNICAL FIELD

The present patent application relates to hydraulic systems, and more particularly, to hydraulic joints.

BACKGROUND

Hydraulic systems are used for a variety of applications such as for steering, fan and/or other driven components by vehicles (e.g., industrial machines, transport, commercial and marine vehicles). In many of these applications, the flow lines and joints between the system components are exposed to harsh environments, for example, a high degree of temperature change. These harsh environments can lead to the rapid failure of the flow lines/joint causing safety concerns.

In many countries and for many applications, safety regulations have been promulgated to address safety concerns that can result from the harsh operational environment. These regulations tend to require inspection and/or replacement of the flow lines/joints after a set period of time. For example, in Australia, mining machinery safety regulations dictate that hydraulic hoses in engine bays must be replaced every twelve months. As one can image, the repeated replacement of such hoses and joints can be expensive over the long term.

OVERVIEW

Various systems and apparatuses are disclosed that can be used to accommodate high capacity hydraulic flow and/or in applications where hydraulic flow lines/joint is exposed to harsh environment (e.g., an environment with a good deal of expansion and contraction between components). In some cases, these systems and apparatuses can be used with wind turbine hydraulic lines that can require a high capacity of hydraulic fluid (e.g., 4,000 liters/min per megawatt). Such wind power application also utilizes long hydraulic flow lines that are subject to expansion and contraction due to length and the harsh environment. Further applications are contemplated including in the engine bays of industrial machines, which are also subject to harsh conditions. Indeed, the hydraulic flow lines/joint disclosed herein is broadly applicable to any vehicle not just those operating in harsh conditions.

As used herein the term "vehicle" means virtually all types of vehicles such as earth moving equipment (e.g., mining equipment, wheel loaders, mini-loaders, backhoes, dump trucks, crane trucks, transit mixers, etc.), waste recovery vehicles, marine vehicles, industrial equipment (e.g., agricultural equipment), personal vehicles, public transportation vehicles, and commercial road vehicles (e.g., heavy road trucks, semi-trucks, etc.).

The present inventor has recognized that currently available hydraulic joints and flow lines can have a relatively short useable life prior to failure due to harsh conditions (e.g., high temperature variability). The inventor has further recognized that currently available hydraulic joints and flow lines may be inadequate to handle capacity or may be inadequate to meet other criteria in some applications (e.g., as fluid lines in a wind power application). In view of these challenges, the present inventor has recognized hydraulic joint assembly that is flexible to better accommodate relative movement between portions of the joint. The present inventor has further purposed an arrangement of seals in the joint assembly to better accommodate harsh conditions and/or capacity requirements.

To further illustrate the systems, methods and/or apparatuses disclosed herein, the following non-limiting examples are provided:

Example 1 is an assembly comprising: a first section defining a first passageway therein to receive and pass a fluid; a second section defining a second passageway that communicates with the first passageway, the second section and the first section together forming a first ball joint having an internal portion and an external portion, the first ball joint comprising a moveable coupling between second section and the first section; a third section defining a third passageway that communicates with the second passageway, the third section telescopically receiving the second section therein and configured to form a linearly moveable joint between the third section and the second section; and a fourth section defining a fourth passageway that communicates with the third passageway, the fourth section and the third section together forming a second ball joint having an internal portion and an external portion, the second ball joint comprising a moveable coupling between the fourth section and the third section.

In Example 2, the subject matter of Example 1 optionally includes wherein one or more of the first section, the second section, the third section and the fourth section is configured to house a seal, wherein the seal is configured to allow for the passage of a portion of the fluid as a weep into a volume defined between at least the seal, the one or more of the first section, the second section, the third section and the fourth section and a second seal, and wherein the one or more of the first section, the second section, the third section and the fourth section is configured to define a passageway to drain the portion of the fluid from the volume.

In Example 3, the subject matter of Example 2 optionally includes wherein the seal comprises a Teflon bronze seal and is one of at least three seals provided between each of the first section and the second section, the second section and the third section, and the third section and the fourth section.

In Example 4, the subject matter of any one or more of Examples 1-3 optionally include wherein one or more of the first section that forms the first passageway and the fourth section that forms the fourth passageway has at least one flared end portion configured to form a portion of a curvature of the external portion of at least one of the first ball joint and the second ball joint.

In Example 5, the subject matter of Example 4 optionally includes wherein the at least one flared end portion abuts a mating second flared portion of at least one of the second section and the third section at an interface, and wherein the interface allows a portion of the fluid to flow into a volume defined between at least one of the internal portion and the external portion of the first ball joint and the internal portion and the external portion of the second ball joint.

In Example 6, the subject matter of Example 5 optionally includes wherein the portion of the fluid that flows into the volume defined between the internal portion and the external portion of one or more of the first ball joint and the second ball joint further weeps past a first seal in the one or more of the first ball joint and the second ball joint and into a second volume defined between the first seal, the internal portion and the external portion of the one or more of the first ball joint and the second ball joint and a second seal.

In Example 7, the subject matter of any one or more of Examples 5-6 optionally include wherein the first seal comprises a Teflon bronze seal and is one of at least three seals provided between each of the first section and the second section, the second section and the third section, and the third section and the fourth section.

In Example 8, the subject matter of any one or more of Examples 1-7 optionally include a circlip disposed between the second section and the third section, wherein the second section includes a flange projection received in a cavity of the third section and the circlip is configured to act as a stop to halt a movement of the flange projection out of the cavity.

In Example 9, the subject matter of any one or more of Examples 1-8 optionally include wherein the assembly is configured such that each seal is recessed in one or more of the first section, the second section, the third section and the fourth section, the assembly with each seal recessed allowing for a relative movement between the first section and the second section, the second section and the third section, and the third section and the fourth section.

In Example 10, the subject matter of any one or more of Examples 1-9 optionally include a flange configured to abut and be fastened to one or more of the first section and the fourth section, the flange configured to form a part of the external portion of one or more of the first ball joint and the second ball joint, wherein the flange is configured to house at least two seals in grooves therein and is configured to interface with one or more of the second section and the third section.

In Example 11, the subject matter of any one or more of Examples 2-10 optionally include a third seal disposed within a volume defined between at least the seal, the one or more of the first section, the second section, the third section and the fourth section and the second seal, the third seal configured to expand and contract in response to temperature to regulate the weep to the passageway to drain the portion of the fluid from the volume.

In Example 12, the subject matter of Example 11 optionally includes wherein the third seal is configured to expand in the event of a fire or another high temperature event that results in an elevated temperature to block or substantially restrict the weep to the passageway.

In Example 13, the subject matter of any one or more of Examples 11-12 optionally include a second passageway having a connector configured to connect with a leakage monitor.

In Example 14, the subject matter of Example 13 optionally includes wherein the second passageway communicates with the volume between the third seal and the second seal.

Example 15 is a system of joints comprising: a first section configured to define a first passageway therein; a second section configured to define a second passageway, the second section and the first section together configured to form a first ball joint having an internal portion and an external portion, the first ball joint configured as a moveable coupling between second section and the first section when the second section and the first section are assembled together; and a third section configured to define a third passageway, the third section configured to telescopically receive the second section therein and configured to form a linearly moveable joint between the third section and the second section when the third section and the second section are assembled together.

In Example 16, the subject matter of Example 15 optionally includes a fourth section configured to define a fourth passageway, the fourth section and the third section together configured to form a second ball joint having an internal portion and an external portion, the second ball joint configured as a moveable coupling between the fourth section and the third section when the fourth section and the third section are assembled together.

In Example 17, the subject matter of any one or more of Examples 15-16 optionally include at least six seals with at least at least three seals provided between each of the first section and the second section and the second section and the third section.

In Example 18, the subject matter of Example 17 optionally includes wherein at least two of the at least six seals comprise Teflon bronze seals, at least one of the Teflon bronze seals disposed between each of the first section and the second section and the second section and the third section.

In Example 19, the subject matter of any one or more of Examples 17-18 optionally include wherein the first section and the third section are configured such that each of the six seals is recessed from the second section when installed thereby allowing for a relative movement between the first section and the section and the second section and the third section.

In Example 20, the subject matter of any one or more of Examples 15-19 optionally include a circlip configured to be disposed between the second section and the first section, wherein the second section has a flange projection configured to be received in a cavity of the third section and the circlip is configured to act as a stop to halt a movement of the flange projection out of the cavity.

In Example 21, the subject matter of any one or more of Examples 15-20 optionally include a flange configured to abut and be fastened to the first section, the flange configured to form a part of the external portion of the first ball joint, wherein the flange is configured to house at least two seals in grooves therein and is configured to interface with the second section.

In Example 22, the subject matter of any one or more of Examples 15-21 optionally include wherein the first section forming the first passageway has at least one flared end portion configured to form a curvature of the internal portion of the first ball joint.

In Example 23, the subject matter of any one or more of Examples 16-22 optionally include wherein one or more of the first section, the second section, the third section and the fourth section is configured to house a seal, wherein the seal is configured to allow for the passage of a portion of the fluid as a weep into a volume defined between at least the seal, the one or more of the first section, the second section, the third section and the fourth section and a second seal, and wherein the one or more of the first section, the second section, the third section and the fourth section is configured to define a passageway to drain the portion of the fluid from the volume.

In Example 24, the subject matter of Example 23 optionally includes a third seal disposed within a volume defined between at least the seal, the one or more of the first section, the second section, the third section and the fourth section and the second seal, the third seal configured to expand and contract in response to temperature to regulate the weep to the passageway to drain the portion of the fluid from the volume.

In Example 25, the subject matter of Example 24 optionally includes wherein the third seal is configured to expand in the event of a fire or another high temperature event that results in an elevated temperature to block or substantially restrict the weep to the passageway.

In Example 26, the subject matter of any one or more of Examples 24-25 optionally include a second passageway having a connector configured to connect with a leakage monitor.

In Example 27, the subject matter of Example 26 optionally includes wherein the second passageway communicates with the volume between the third seal and the second seal.

Example 28 is an assembly comprising: a first section defining a first passageway therein to receive a fluid; a second section defining a second passageway that communicates with the first passageway, the second section and the first section together forming a first ball joint having an internal portion and an external portion, the first ball joint comprising a moveable coupling between second section and the first section; a third section defining a third passageway that communicates with the second passageway, the third section telescopically receiving the second section therein and configured to form a linearly moveable joint between the third section and the second section; and a first seal positioned at the first ball joint and configured to allow for the passage of a portion of the fluid as a weep into a volume defined between the internal portion and the external portion and a second seal.

In Example 29, the subject matter of Example 28 optionally includes wherein the first section is configured to define a passageway to drain the fluid from the volume.

In Example 30, the subject matter of any one or more of Examples 28-29 optionally include a fourth section defining a fourth passageway that communicates with the third passageway, the fourth section and the third section together forming a second ball joint having an internal portion and an external portion, the second ball joint comprising a moveable coupling between the fourth section and the third section.

In Example 31, the subject matter of Example 30 optionally includes a third seal positioned at the second ball joint and configured to allow for the passage of a second portion of the fluid as a weep into a second volume defined between the internal portion and the external portion of the second ball joint and a fourth seal.

In Example 32, the subject matter of Example 31 optionally includes a fifth seal positioned between the second section and the third section and configured to allow for the passage of a third portion of the fluid as a weep into a third volume defined between the second section, the third section and a sixth seal.

In Example 33, the subject matter of Example 32 optionally includes wherein the first seal, third seal and fifth seal each comprise a Teflon bronze seal and at least three seals are provided between each of the first section and the second section, the second section and the third section, and the third section and the fourth section.

In Example 34, the subject matter of any one or more of Examples 28-33 optionally include wherein the first section that forms the first passageway has at least one flared end portion configured to form a curvature of the internal portion of the first ball joint.

In Example 35, the subject matter of any one or more of Examples 28-34 optionally include a circlip disposed between the second section and the first section, wherein the second section includes a flange projection received in a cavity of the third section and the circlip is configured to act as a stop to halt a movement of the flange projection out of the cavity.

In Example 36, the subject matter of any one or more of Examples 28-35 optionally include wherein the assembly is configured such that each seal is recessed in one or more of the first section, the second section, the third section and the fourth section, the assembly with each seal recessed allowing for a relative movement between the first section and the second section and the second section and the third section.

In Example 37, the subject matter of any one or more of Examples 28-36 optionally include a flange configured to abut and be fastened to the first section and the fourth section, the flange configured to form a part of the external portion of the first ball joint, wherein the flange is configured to house at least two seals in grooves therein and is configured to interface with the second section.

In Example 38, the subject matter of any one or more of Examples 28-37 optionally include a third seal disposed within the volume, the third seal configured to expand and contract in response to temperature to regulate the weep to the passageway to drain the portion of the fluid from the volume.

In Example 39, the subject matter of Example 38 optionally includes wherein the third seal is configured to expand in the event of a fire or another high temperature event that results in an elevated temperature to block or substantially restrict the weep to the passageway.

In Example 40, the subject matter of any one or more of Examples 38-39 optionally include a second passageway having a connector configured to connect with a leakage monitor.

In Example 41, the subject matter of Example 40 optionally includes wherein the second passageway communicates with the volume between the third seal and the second seal.

In Example 42, the subject matter of any one or more of Examples 1-41 optionally include a swivel assembly configured to moveably couple to the fourth section.

In Example 43, the subject matter of any one or more of Examples 16-42 optionally include a swivel assembly configured to moveably couple to the fourth section.

In Example 44, the subject matter of any one or more of Examples 30-43 optionally include a swivel assembly configured to moveably couple to the fourth section.

In Example 45, the assemblies and/or systems of any one or any combination of Examples 1-44 can optionally be configured such that all elements or options recited are available to use or select from.

These and other examples and features of the present devices and systems will be set forth in part in the following Detailed Description. This overview is intended to provide a summary of subject matter of the present patent application. It is not intended to provide an exclusive or exhaustive removal of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present application relates to flow lines for fluid such as hydraulic fluids, and in particular, to an assembly and system of a plurality sections and joints that together form a flow line for fluid to pass therethrough. The assembly/ system can be configured to allow for relative movement between the sections at the joints. As is shown in various embodiments of the FIGURES, the assembly/system can be used with either relatively non-flexible flow line such as pipe or with more flexible flow lines such as hose, for example. According to one embodiment, the present application comprises an assembly that can include a first section, a second section and a third section. The first section can define a first passageway therein to receive and allow for passage of a fluid. The second section can define a second passageway that communicates with the first passageway. The second section and the first section together can form a first ball joint having an internal portion and an external portion. The first ball joint can comprise a moveable coupling between second section and the first section. The third section can define a third passageway that communicates with the second passageway. The third section can telescopically receive the second section therein and can be configured to form a linearly moveable joint between the third section and the second section. According to further embodiments, the assembly can include a first seal positioned at the first ball joint and configured to allow for the passage of a portion of the fluid as a weep into a volume defined between the internal portion and the external portion and a second seal. According to yet further embodiments, the assembly can include a fourth section. The fourth section can define a fourth passageway that communicates with the third passageway. The fourth section and the third section together can form a second ball joint having an internal portion and an external portion. The second ball joint can comprise a moveable coupling between the fourth section and the third section.

Other examples not specifically discussed herein with reference to the FIGURES can be utilized. The disclosed assemblies and systems are applicable to wind turbine power applications, private vehicles, commercial vehicles (e.g., buses, agriculture machines, earth moving equipment, waste collection vehicles, fishing trawlers, cranes, etc.), and in any other application that uses a hydraulic flow.

Figure 1:
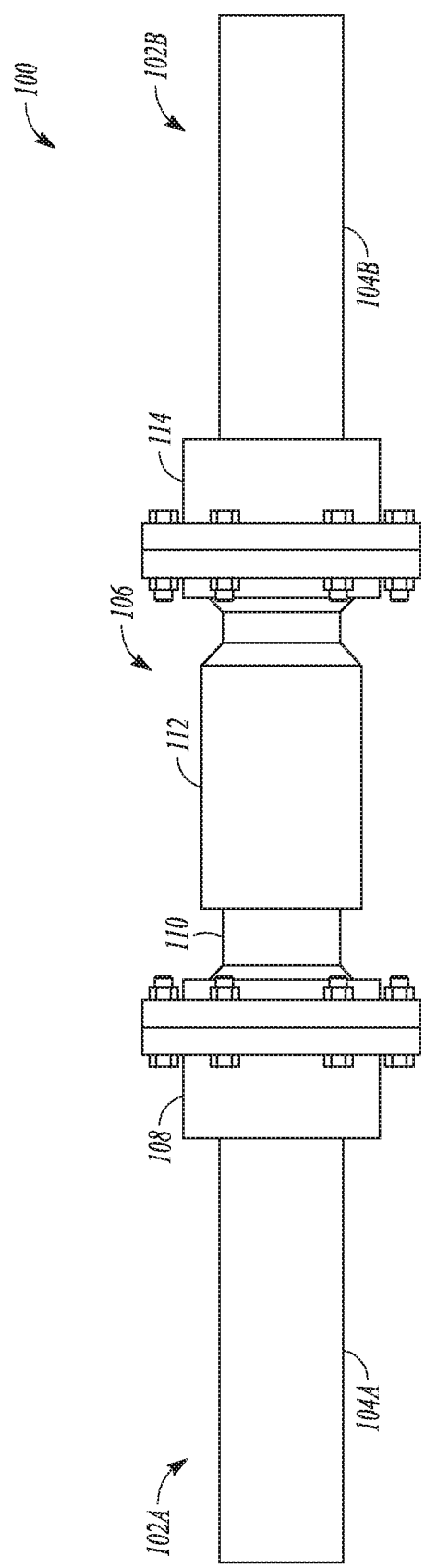
FIG. 1 is schematic view of an assembly that can be part of a hydraulic system, the assembly includes a plurality of sections according to an example of the present application.

FIG. 1 shows a perspective view of an assembly 100 coupling a first fluid line 102A to a second fluid line 102B. In the example of FIG. 1, the first fluid line 102A can comprise a pipe 104A and the second fluid line 102B can comprise a pipe 104A. The assembly 100 can comprise a system 106 for interconnection as will be discussed subsequently. The assembly 100 can include a first section 108, a second section 110, a third section 112, and a fourth section 114.

FIG. 1 shows broadly that the first fluid line 102A can be coupled in a fixed attachment manner (i.e. at a relatively fixed joint) to the first section 108. In turn, the first section 108 can be moveably coupled with the second section 110 as will be discussed subsequently. Thus, the first section 108 and the second section 110 can form a moveable joint that allows for relative movement between the first section 108 and the second section 110.

As shown in the embodiment of FIG. 1, the second section 110 can be telescopically received within the third section 112 such that the second section 110 can be linearly moveably coupled with the third section 112. Thus, the second section 110 and the third section 112 can form a moveable joint that allows for linear relative movement between the second section 110 and the third section 112.

Similarly, the third section 112 can be moveably coupled with the fourth section 114 as will be discussed subsequently. Thus, the third section 112 and the fourth section 114 can form a moveable joint that allows for relative movement between the third section 112 and the fourth section 114. The fourth section 114 can be coupled in a fixed attachment manner (i.e. at a relatively fixed joint) to the second fluid line 102B.

Figure 1A:
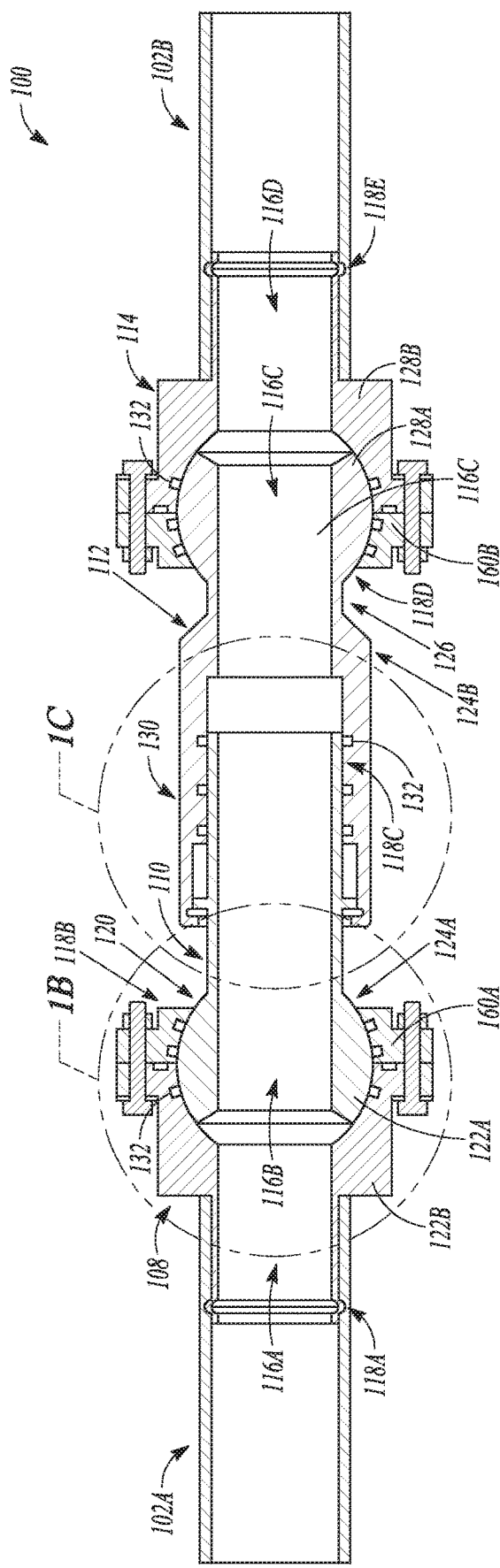
FIG. 1A is a cross-sectional view of the assembly of FIG. 1 according to an example of the present application

FIG. 1A shows a cross-section of the assembly 100, the first fluid line 102A, and the second fluid line 102B. As previously discussed with respect to FIG. 1, the assembly 100 can include the first section 108, the second section 110, the third section 112 and the fourth section 114.

As shown in FIG. 1A, the first section 110 can be configured to define a first passageway 116A configured to receive and allow for passage of a fluid such as a hydraulic fluid. Similarly, the second section 110 can be configured to define second passageway 116B that communicates with the first passageway 116A thereby allowing for passage of the fluid through the second section 110. In a similar manner, the third section 112 can configured to define a third passageway 116C that communicates with the second passageway 116B and thereby allows for passage of the fluid through the third section 112. The fourth section 114 can be configured to define a fourth passageway 116D that communicates with the third passageway 116C and thereby allows for passage of the fluid through the fourth section 114. Thus, the assembly 100 is configured to allow for passage of the fluid from the first flow line 102A to the second flow line 102B.

As shown in FIG. 1A, the first section 108 can be affixed to the first flow line 102A at a fixed joint 118A. The first section 108 can be moveably coupled to the second section 110 at a movable joint 118B. According to the example of FIG. 1A, the moveable joint 118B can comprise a first ball joint 120. Thus, the first ball joint 120 can comprise a moveable coupling 124A between the first section 108 and the second section 110. Together the second section 110 and the first section 108 can form the first ball joint 120, which can have an internal portion 122A and an external portion 122B. The internal portion 122A can be formed by the second section 110 and the external portion 122B can be formed by the first section 108 according to the embodiment of FIG. 1A. However, such relationship can be reversed according to other embodiments.

The second section 110 can be moveably coupled to the third section 112 at a linearly movable joint 118C. More particularly, the third section 112 can be configured to telescopically receive the second section 110 therein. Together the third section 112 and the second section 110 can be configured to form a linearly moveable joint 118C between the third section 112 and the second section 110.

The fourth section 114 can be moveably coupled to the third section 112 at a movable joint 118D. According to the example of FIG. 1A, the moveable joint 118D can comprise a second ball joint 126. Thus, the second ball joint 126 can comprise a moveable coupling 124B between the fourth section 114 and the third section 112. Together the third section 112 and the fourth section 114 can form the second ball joint 126, which can have an internal portion 128A and an external portion 128B. The internal portion 128A can be formed by the third section 112 and the external portion 128B can be formed by the fourth section 114 according to the embodiment of FIG. 1A. However, such relationship can be reversed according to other embodiments. As shown in FIG. 1A, the fourth section 114 can be affixed to the second flow line 102B at a second fixed joint 118B.

As shown in the embodiment of FIG. 1A, the assembly 100 can have a plurality of seals 130 including at least one weeping seal 132. According to the embodiment of FIG. 1A, the weeping seal 132 can comprise a Teflon bronze seal. In other embodiments, other O-ring type seals that are configured to allow for weeping of fluid past the seal in a controlled manner are contemplated. The seal 132 can be one of at least three seals (part of the plurality of seals 130) provided between each of the first section 108 and the second section 110, the second section 110 and the third section 112, and the third section 112 and the fourth section 114.

One or more of the first section 108, the third section 112 and the fourth section 114 can be configured to house the weeping seal 132. Indeed, in the embodiment of FIG. 1A all of the first section 108, the third section 112 and the fourth section 114 can be configured to house at least one weeping seal 132 therein such as in a recess 134 (numbered only in the enlargements of FIGS. 1B and 1C) specifically configured to receive the seal 132. Indeed, according to some embodiments such as the embodiment of FIGS. 1A to 1C, the assembly 100 can be configured such that each seal 130 can be recessed in one or more of the first section 108, the third section 112 and the fourth section 114. The assembly 100 with each seal 130 recessed can allow for a relative movement between the first section 108 and the second section 110, the second section 110 and the third section 112, and the third section 112 and the fourth section 114.

Figure 1B:
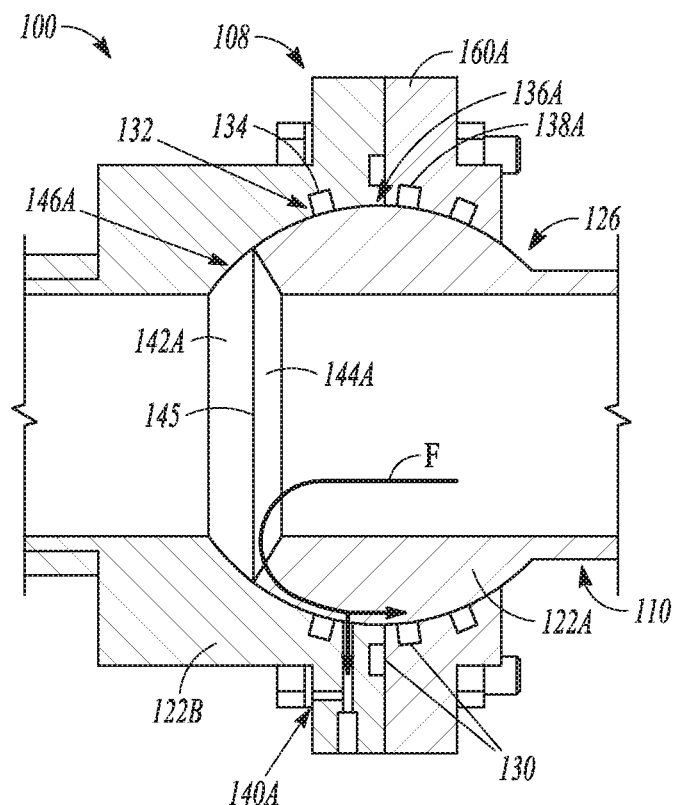
FIG. 1B is an enlarged cross-sectional view of a first joint between a first section and a second section of the assembly of FIG. 1A according to an example of the present application.
Figure 1C:
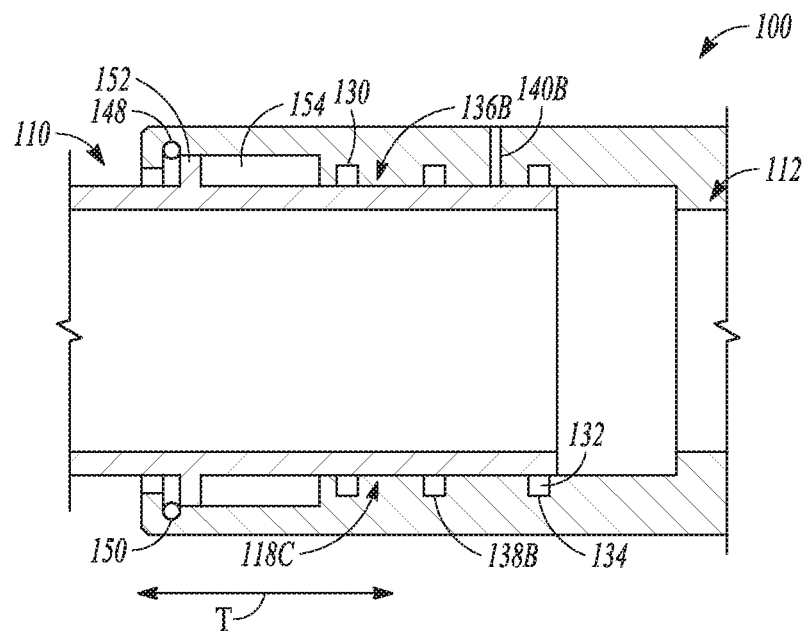
FIG. 1C is an enlarged cross-sectional view of a second joint between the second section and a third section of the assembly of FIG. 1A according to an example of the present application.

According to one embodiment the seal 132 can be configured to allow for the passage of a portion of the fluid (shown by arrow F in FIGS. 1B and 1C) as a weep into a volume (numbered 136A in FIG. 1B and 136B in FIG. 1C) defined between at least the seal 132, the one or more of the first section 108, the third section 112, and the fourth section 114 and a second seal (numbered 138A in FIG. 1B and 138B in FIG. 1C). The one or more of the first section 108, the third section 112 and the fourth section 114 can be configured to define a passageway (numbered 140A in FIG. 1B and 140B in FIG. 1C) configured to drain the portion of the fluid from the volume (numbered 136A in FIG. 1B and 136B in FIG. 1C) as shown by arrow F.

One or more of the first section 108 that forms the first passageway 116A and the fourth section 114 that forms the fourth passageway 116D can have at least one flared end portion 142A and 142B configured to form a portion of the curvature of the external portion 122B, 128B of at least one of the first ball joint 120 and the second ball joint 126. In the embodiment of FIG. 1A, both the first section 116A and the fourth section 114 can be configured to have the at least one flared end portion 142A, 142B.

As shown in FIG. 1A, the at least one flared end portion 142A, 142B can abut a mating second flared portion 144A, 144B of at least one of the second section 110 and the third section 112 at an interface. The interface (number 145 in FIG. 1B) can be configured to allow a portion of the fluid (shown as F in FIG. 1B) to flow into a volume (numbered 146A in FIG. 1B) defined between at least one of the internal portion 122A and the external portion 122B of the first ball joint 120 and the internal portion 128A and the external portion 128B of the second ball joint 126. The portion of the fluid (shown as F in FIGS. 1B and 1C) that flows into the volume (numbered 146A in FIG. 1B and 146B in FIG. 1C) can be defined between the internal portion 122A, 128A and the external portion 122B, 128B of one or more of the first ball joint 120 and the second ball joint 126 can further weep past the weeping seal 132 in the one or more of the first ball joint 126 and the second ball joint 128 and into the volume (numbered 136A in FIG. 1B and 136B in FIG. 1C) defined between the seal 132, the internal portion 122A, 128A and the external portion 122B, 128B of the one or more of the first ball joint 120 and the second ball joint 126 and the second seal (numbered 138A in FIG. 1B and 138B in FIG. 1C).

As shown in FIG. 1A and is further shown in FIG. 1C, a circlip 148 can be disposed between the second section 110 and the third section 112. In particular, the third section 112 can have a groove 150 (numbered in FIG. 1C) which can be configured to capture the circlip 148 therein. As shown in the embodiment of FIGS. 1A and 1C, the second section 110 can include a flange projection 152 received in a cavity 154 of the third section 112. The circlip 148 can be configured to act as a stop to halt a movement of the flange projection 152 out of the cavity 154. However, the second section 110 and the flange projection 152 can translate a limited distance within the cavity 154 as shown by arrow T in FIG. 1C.

As shown in FIG. 1A and is further shown in the enlargement of FIG. 1B, the assembly 100 can include a flange 160A, 160B configured to abut and be fastened to one or more of the first section 108 and the fourth section 114. In particular, as shown in FIG. 1A, the flange 160A can abut and be fastened by bolt or other manner to the first section 108. Similarly, the flange 160B can abut and be fastened by bolt or other manner to the fourth section 114. The flange 160A, 160B can be configured to form a part of the external portion 122B. 128B of one or more of the first ball joint 120 and the second ball joint 126. The flange 160A, 160B can be configured to house at least two seals (numbered 138A and 138C in FIG. 1B) in grooves therein. The flange 160A. 160B can be configured to interface with one or more of the second section 110 and the third section 112 as part of the first ball joint 120 and/or the second ball joint 126.

FIG. 1B provides an enlargement of the first ball joint 120 including the internal portion 122A and the external portion 122B formed by the first section 108 and the second section 110, respectively as previously described. Further details regarding the construct shown in FIG. 1B are described above.

FIG. 1C provides an enlargement of the linearly movable joint 118C formed between the second section 110 and the third section 112. Further details regarding the construct shown in FIG. 1C are described above.

Figure 2:
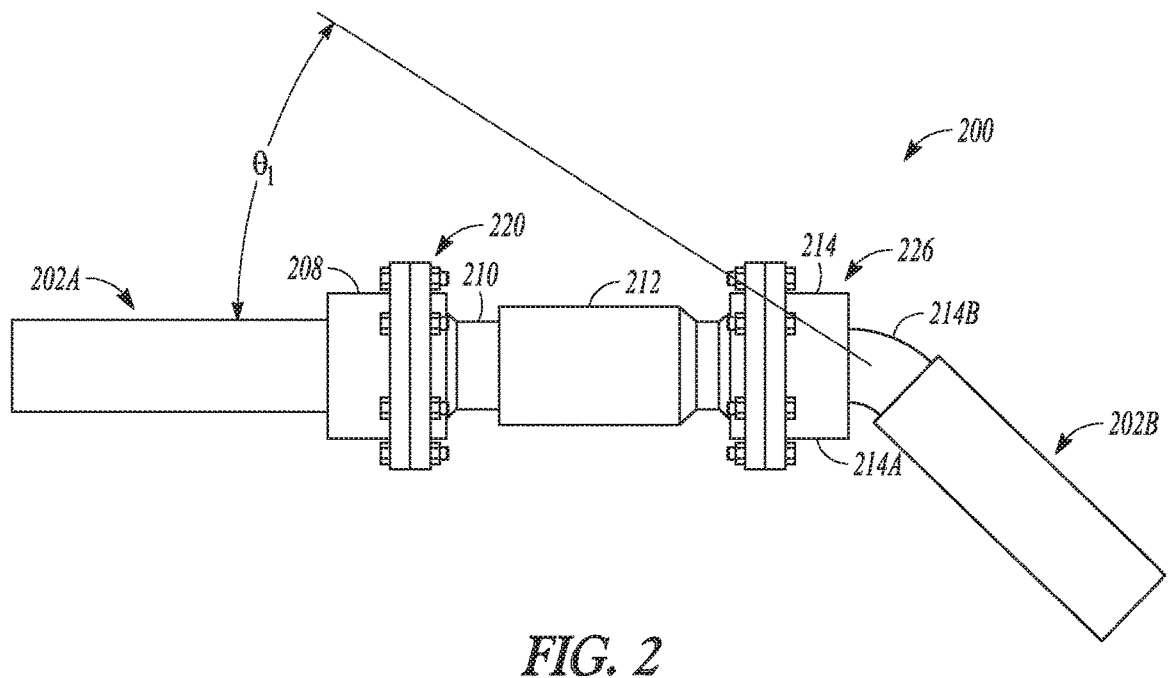
FIGS. 2 and 2A show an assembly according to another example of the present application with the assembly of FIG. 2A having sections with positions moved relative to those of the assembly of FIG. 2.
Figure 2A:
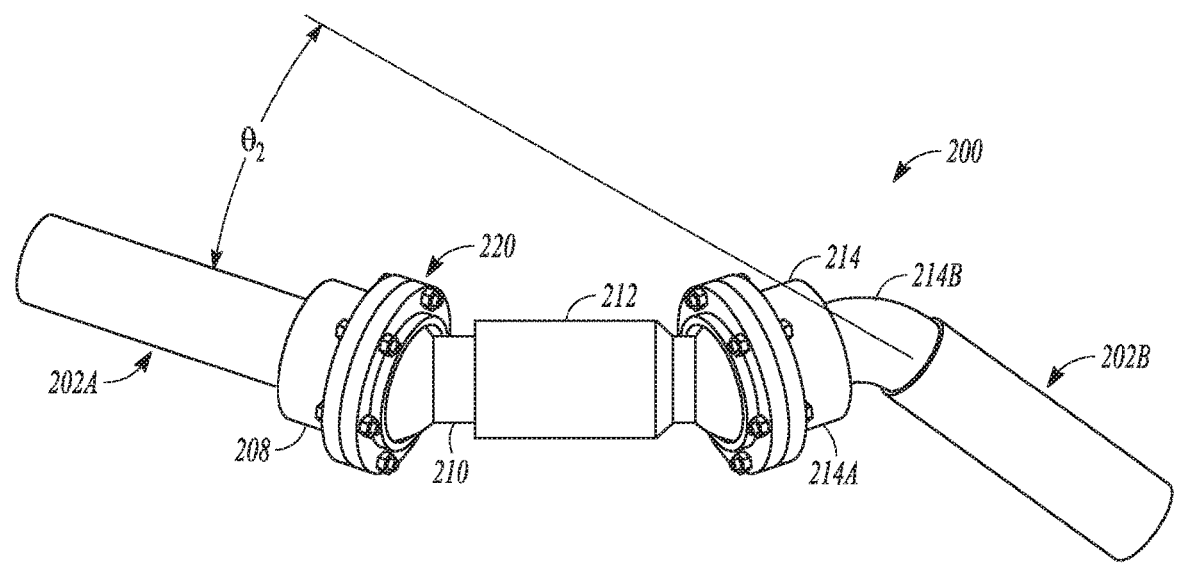

FIGS. 2 and 2A show an assembly 200, a first fluid line 202A and a second fluid line 202B according to another embodiment. The assembly 200 can be constructed in the manner described similar to that of assembly 100, and thus, the assembly 200 can include a first section 208, a second section 210, a third section 212, a fourth section 214.

As the construction of the components of assembly 200 is detailed with respect to assembly 100, the description of FIGS. 2 and 2A will focus on construction and other details that differ slightly between assembly 200 and assembly 100. As shown in FIGS. 2 and 2A the fourth section 214 can be configured to bend or turn (e.g., to form a 45° angle from a first portion 214A to a second portion 214B. This construct allows the second fluid line 202B to diverge at an angle $\theta_1$ (FIG. 2) and $\theta_2$ (FIG. 2A) from the direction of the first fluid line 202A.

FIGS. 2 and 2A also show relative movement between the first section 208 and the second section 210 and between the third section 212 and the fourth section 214. As shown in FIG. 2 a first ball joint 220 can be formed by the first section 208 and the second section 210 and can form a first angle $\beta_1$. In FIG. 2A, the first ball joint 220 can allow for relative movement between the first section 208 and the second section 210 such that a second angle $\beta_2$ is formed. $\beta_1$ can differ from $\beta_2$ as shown between FIGS. 2 and 2A.

Similarly, as shown in FIG. 2 a second ball joint 226 can be formed by the third section 212 and the fourth section 214 and can form a third angle $\beta_3$. In FIG. 2A, the second ball joint 226 can allow for relative movement between the third section 212 and the fourth section 214 such that a fourth angle $\beta_4$ is formed. $\beta_3$ can differ from $\beta_4$ as shown between FIGS. 2 and 2A.

Figure 3:
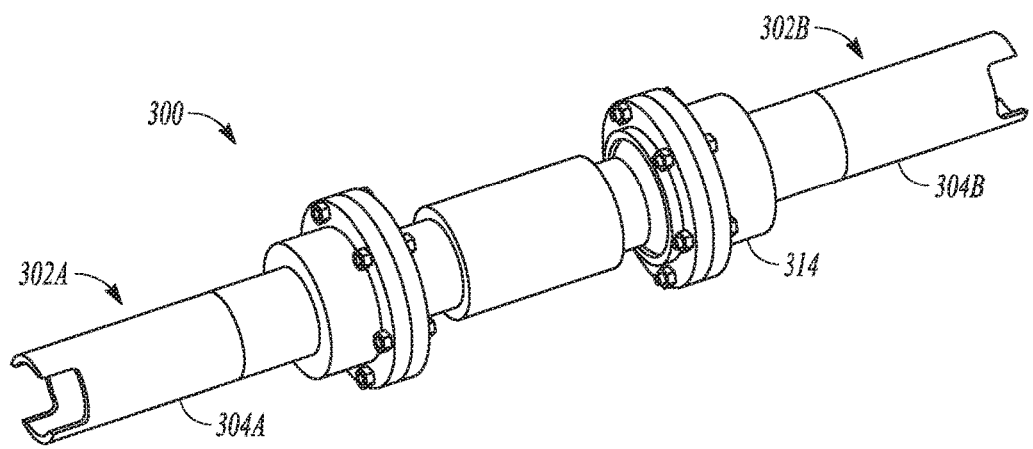
Figure 4:
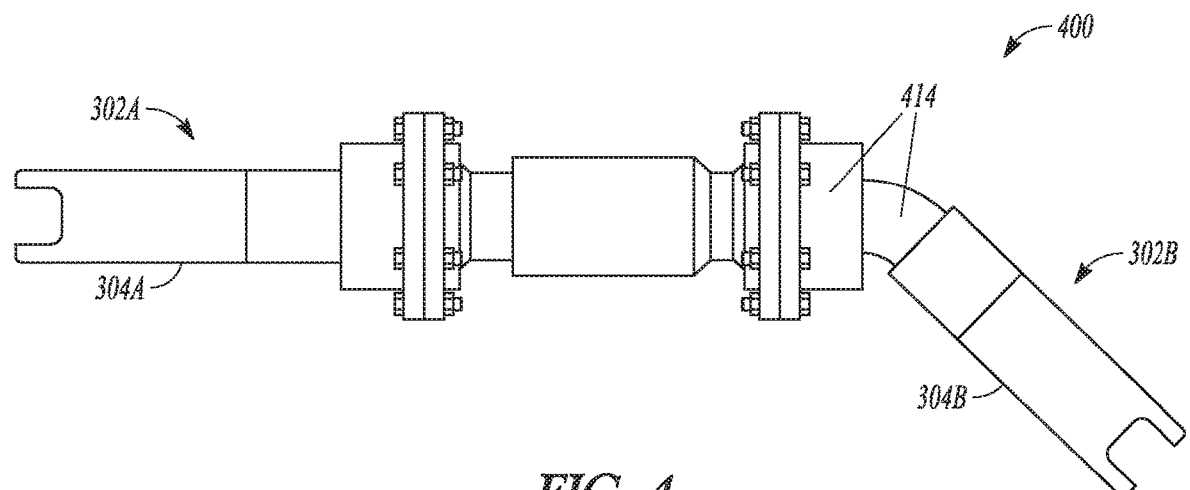
FIGS. 4 to 5 show assemblies according to further examples of the present application that include sections of differing configuration (e.g., straight, 45° turn, 90° turn) and the assembly coupled to hose instead of pipe.
Figure 5:
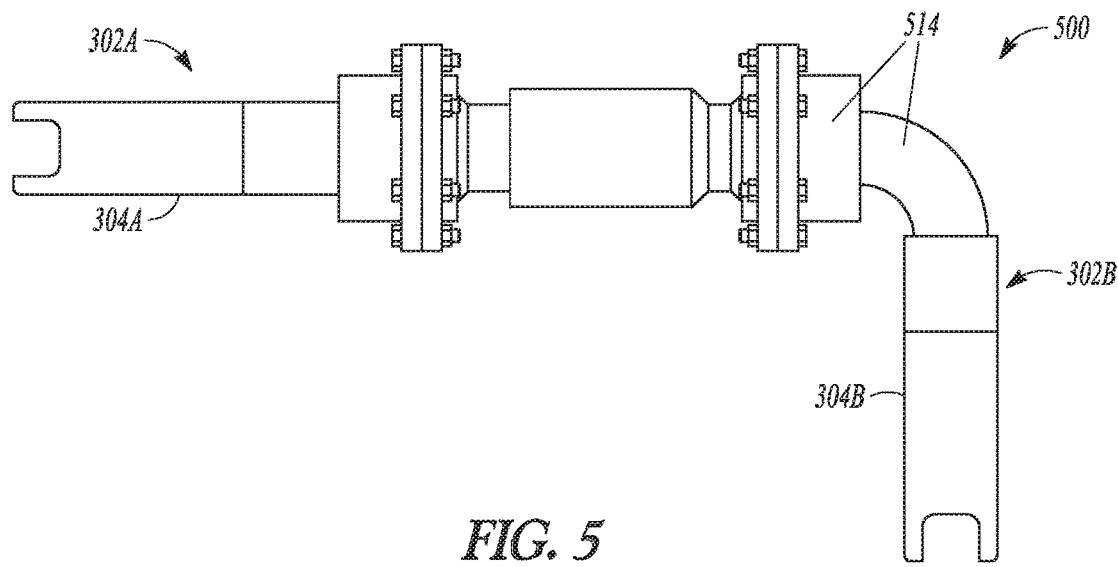

FIGS. 3 to 5 show assemblies 300, 400 and 500 according to further embodiments. The assemblies 300, 400, and 500 can be constructed in a manner similar to those described previously in reference to assemblies 100 and 200. The assemblies 300, 400, and 500 can couple with first and second fluid lines 302A. 302B as shown. According to the embodiment of FIGS. 3 to 5, the first and second fluid lines 302A. 302B can comprise a hose 304A. 304B that can be constructed of heavy duty thermoset plastic such as nylon, for example. According to further examples, the hose 304A, 304B can be constructed virtually any material that has some degree of bendablilty in order to fit into engine bays or other confined space.

The assemblies 300, 400, and 500 differ in that a fourth section 314, 414, and 514 of each has a relatively different construct. The fourth section 314 of FIG. 3 can be substantially straight (i.e. 0°) and does not form a fixed turn. The fourth section 414 of FIG. 4 can be angled to form a fixed turn (e.g., substantially a 45° turn). The fourth section 514 of FIG. 5 can be angled to form a second fixed turn (e.g., substantially a 90° turn).

Figure 6:
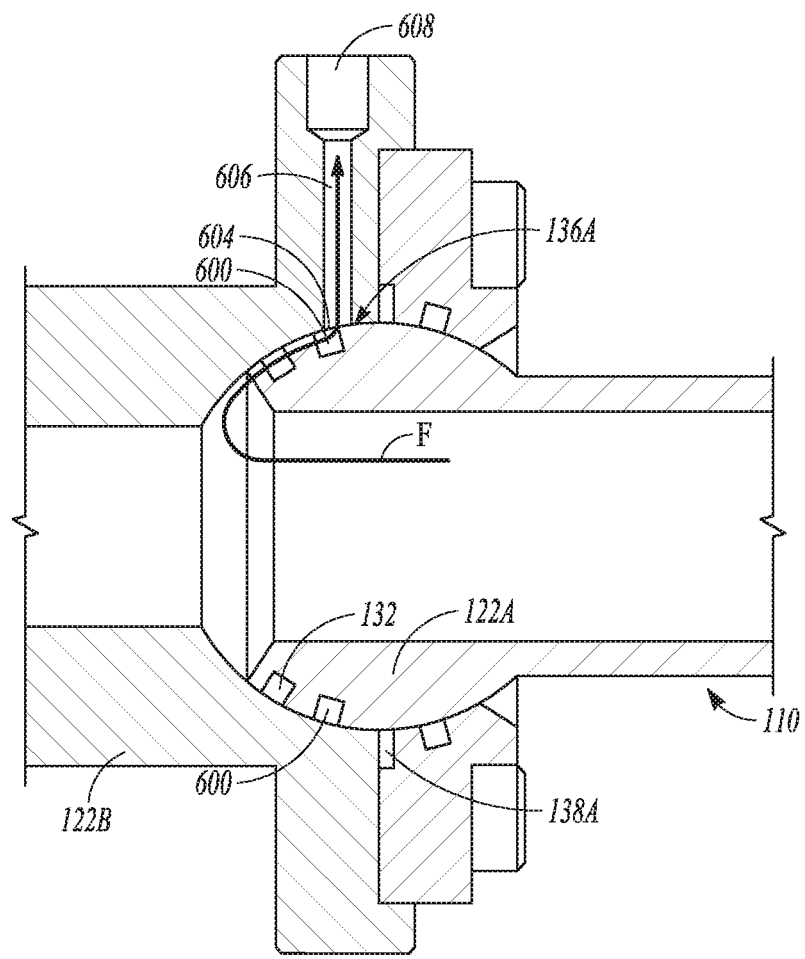
FIG. 6 is an enlarged cross-sectional view of another embodiment of the first joint between the first section and the second section of the assembly as previously shown in FIG. 1B according to an example of the present application.

FIG. 6 provides an enlargement of the first ball joint 120 as previously described in reference to FIGS. 1A and 1B. The first ball joint 120 includes the internal portion 122A and the external portion 122B formed by the first section 108 and the second section 110, respectively as previously described. Further details regarding the construct shown in FIG. 6 are described above in reference to FIGS. 1A and 1B, however, the embodiment of FIG. 6 differs from the embodiment of FIGS. 1A and 1B in at least two respects.

First, an insert or seal 600 can be provided downstream with respect to the flow of the fluid F past the weeping seal 134. Recall the weeping (first) seal 132 can be configured to allow for the passage of a portion of the fluid F as a weep into a volume (numbered 136A in FIG. 6) defined between at least the seal 132 and a second seal (numbered 138A in FIG. 6). The fluid can then drain in the manner discussed in reference to FIGS. 1A, 1B and 1C via the passage 140A (FIG. 1B).

Thus, the first section 108 can be configured to house a seal 132. The seal 132 can be configured to allow for the passage of a portion of the fluid F as a weep into the volume 136A defined between at least the seal 132, the first section 108, the second section 110 and the second seal 138A. The first section 108 can be configured to define a passageway 140A (FIG. 1B) to drain the portion of the fluid F from the volume 136A. A third seal (e.g., the insert or seal 600) can be disposed within the volume 136A defined between at least the seal 132, the one or more of the first section 108, the second section 110, the third section and the fourth section and the second seal 138A. The third seal (e.g., the insert or seal 600) can be configured to expand and contract in response to temperature to regulate the weep to the passageway 140A to drain the portion of the fluid from the volume 136A.

The insert or seal 600 can be bi-metallic in construction. Thus, the insert or seal 600 can be comprised of two or metals/alloys having different relative rates of thermal expansion. For example, an inner face 602 of the insert or seal 600 can be formed of a first metal/alloy and an outer face 604 of the insert or seal 600 can be formed of a second metal/alloy. This can cause the insert or seal 600 to expand and contract in response to temperature variations in a desired manner. For example, in case of fire or other high temperature event the insert or seal 600 can expand to close or substantially restrict volume 136A. This can restrict (stop or substantially slow) the passage of the fluid F to the drain (shown in FIGS. 1A and 1B). In this manner, during a high temperature event, fluid F may not pass to the drain to provide further fuel (or to provide an initial fuel should a fire occur).

The embodiment of FIG. 6 further illustrates a passage 606 can be provided through the first section 108 or another section. The passage 606 can communicate with the volume 136A downstream of the insert or seal 600 and between the insert or seal 600 and the second seal (numbered 138A in FIG. 6). The passage 606 can have a connection 608 configured to couple with a leakage monitor (not shown). The leakage monitor can be configured to sense when the fluid F in the volume deviates from a desired amount. When such deviation is sensed and can alert the user to such condition. For example, the leakage monitor can alert when too large an amount weep is sensed, possibly due to a failure of one of the seals. Conversely, the leakage monitor could alert if too little an amount of weep is sensed. Such condition (too little an amount of weep) could be indicative a high temperature event such as fire.

Figure 7:
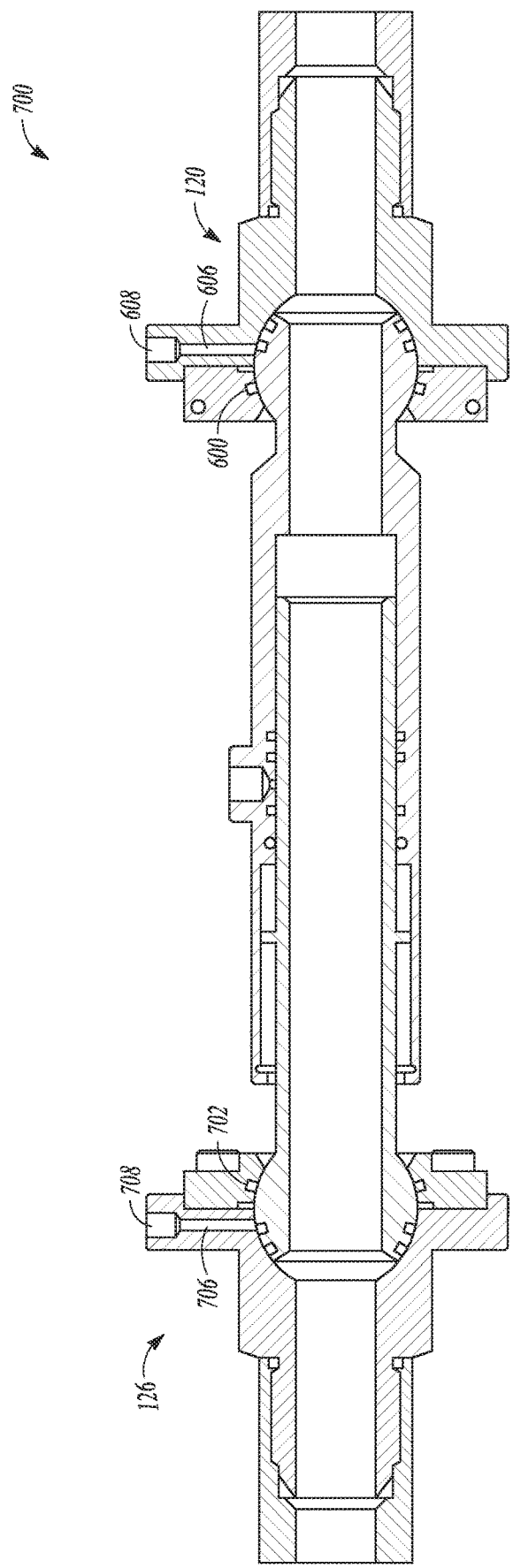
FIG. 7 is schematic view of another embodiment an assembly that can be part of a hydraulic system, the assembly includes the plurality of sections and a plurality of leakage monitoring connections including the leakage monitoring connections previously shown in FIG. 6 according to an example of the present application.

FIG. 7 shows a cross-section of an assembly 700. The assembly 700 can incorporate the insert or seal 600, passage 606 and connection 608 and other features on the first ball joint 120 as previously described in reference to FIG. 6. Additionally, the assembly 700 includes the second ball joint 126 having a similar construction to the first ball joint 120. Thus, the second ball joint 126 can include a second insert or seal 702, a second passage 706 and second connection 708, for example.

Figure 8:
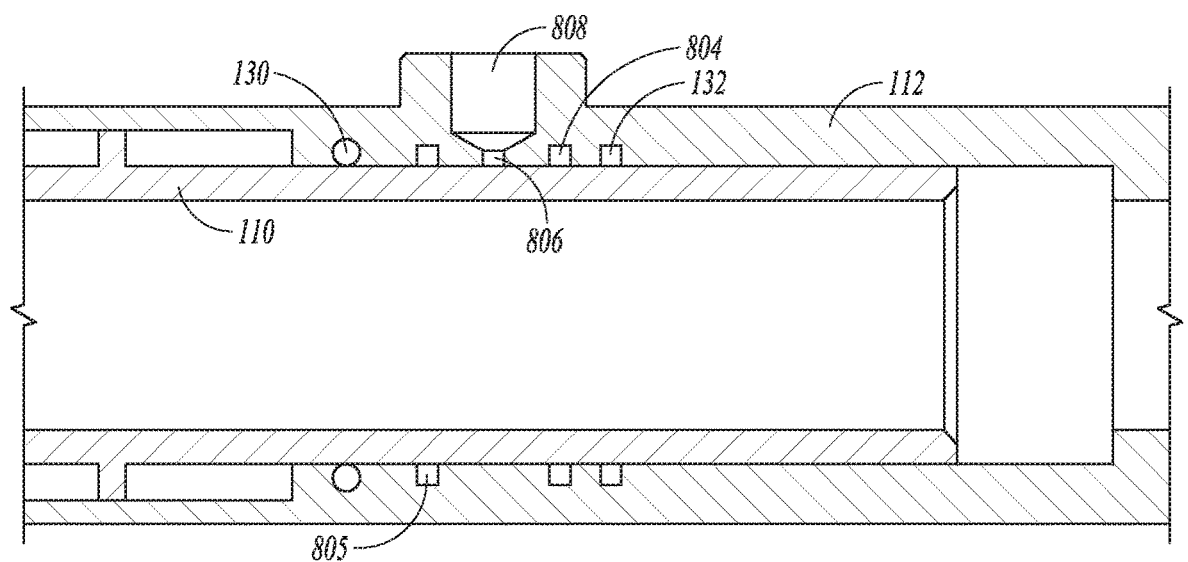
FIG. 8 is an enlarged cross-sectional view of a portion of the embodiment of FIG. 7 showing one of the plurality of leakage monitoring connections according to an example of the present application.

FIG. 8 shows an enlarged cross-sectional view of a second joint between the second section 110 and the third section 112 of the assembly 700 of FIG. 7. The second section 110 and the third section 112 can be constructed and operate in the manner previously described in reference to FIG. 1C of the present application. However, the embodiment of FIG. 8 differs in that in addition to seal 130 and seal 132, the joint between the second section 110 and the third section 112 includes a joint or seal 804 that can be constructed in the manner of insert or seal 600 previously described in reference to FIG. 6. A second seal 805 can also be disposed in the joint between the second section 110 and the third section 112. Additionally, a passage 806 similar to the passage 606 previously described can be disposed to communicate in the volume defined between the second section 110, the third section 112, the second seal 805 and the insert or seal 804. A connection 808 configured to connect with a leakage monitor as previously described in reference to FIG. 6 can communicate with the passage 806. The second seal 805 can comprise a backup safety seal. The insert or seal 804 can comprise a thermal metal (as previously described) and can expand to exclude leakage in case of a fire or other high temperature event.

Figure 9A:
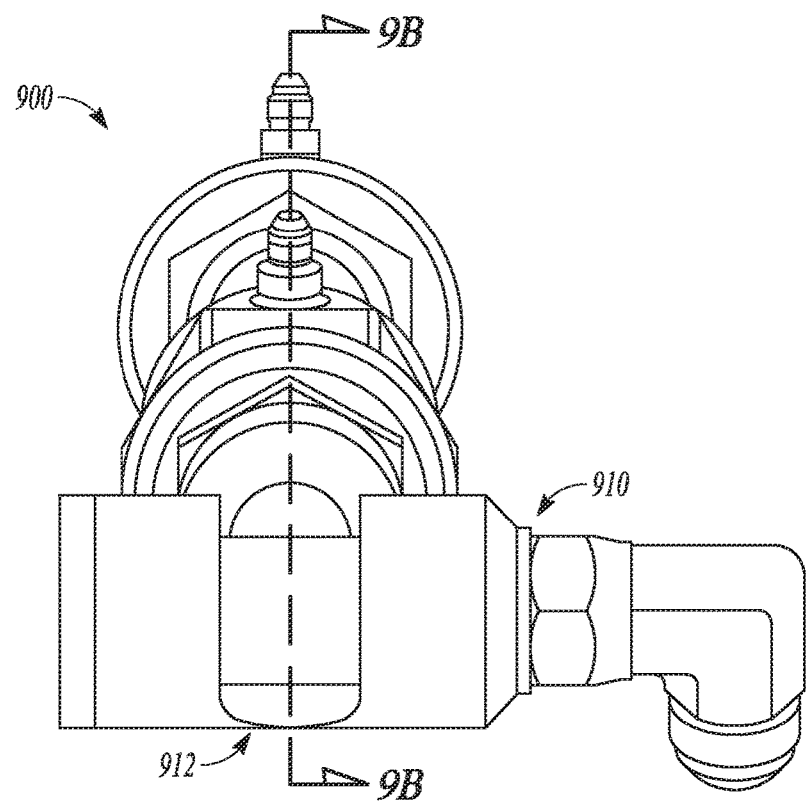
FIG. 9A is a perspective view of yet another embodiment of an assembly that can be part of a hydraulic system, the assembly can include a swivel assembly according to an example of the present application.
Figure 9B:
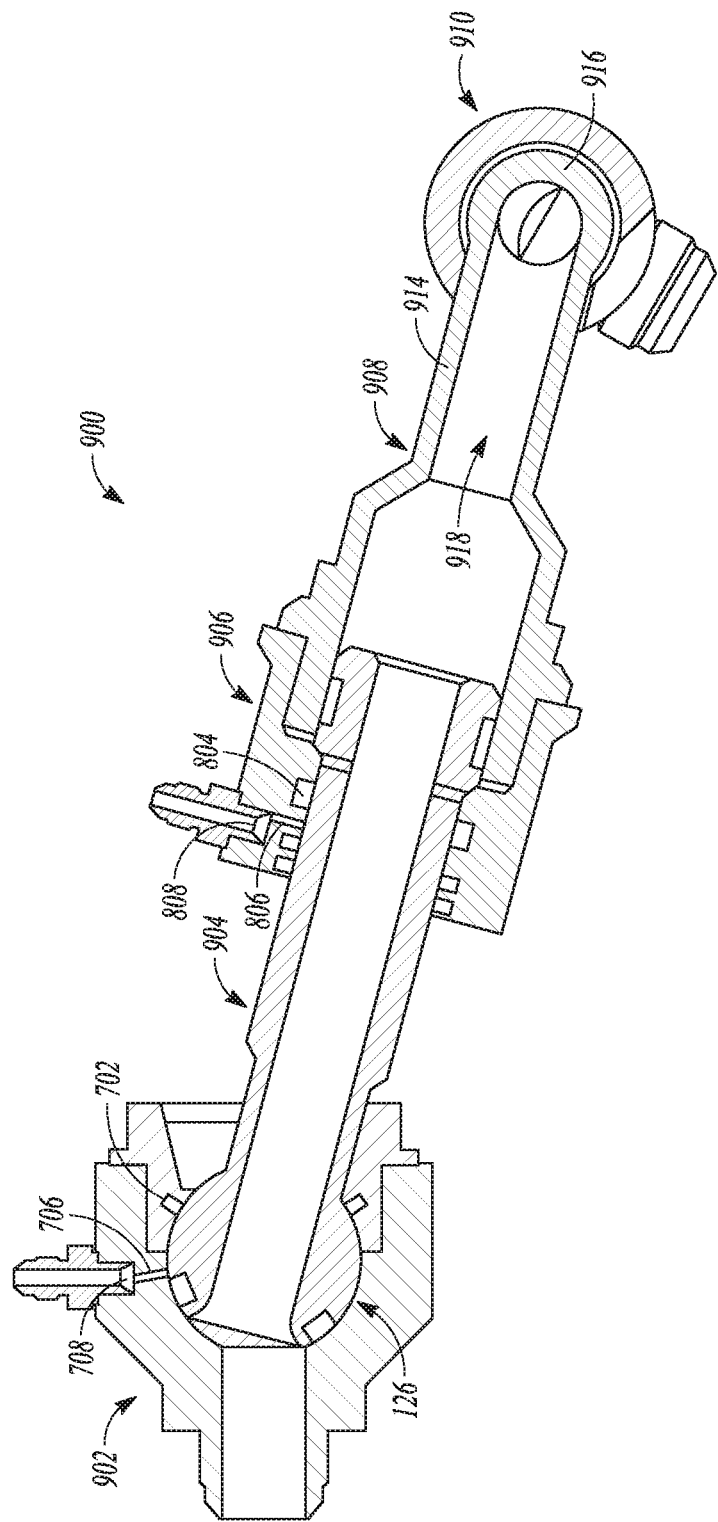
FIG. 9B is a cross-sectional view along B-B of the assembly of FIG. 9A.
Figure 9C:
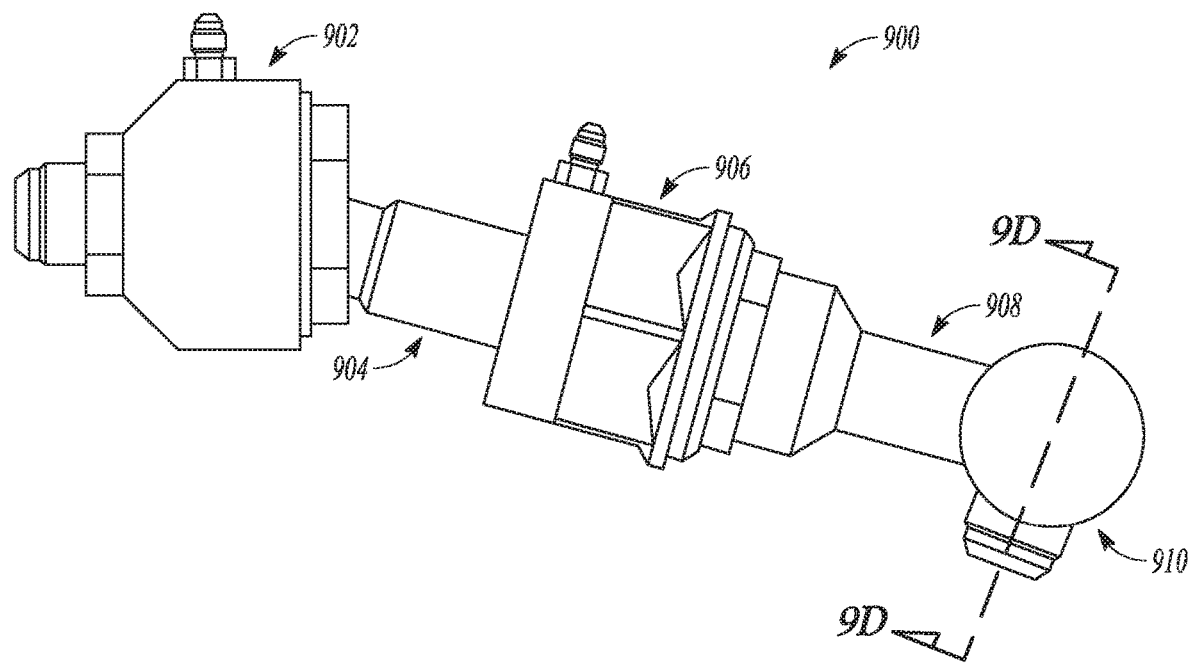
FIG. 9C is a second perspective view of the assembly of FIGS. 9A and 9B.

FIGS. 9A-9D show an assembly 900 having a plurality of sections. These plurality of sections are best shown in FIGS. 9B and 9C and can include a first section 902, a second section 904, a third section 906 and a fourth section 908. The assembly 900 can also include a swivel assembly 910 as shown in FIGS. 9A-9D. FIG. 9B shows the assembly 900 can include features such as the second ball joint 126 (connection between the first section 902 and the second section 904) of having a similar construction to the ball joints as previously described in reference to FIGS. 1A, 1B and 6. Thus, the second ball joint 126 can include a second insert or seal 702, a second passage 706 and second connection 708, for example as previously described in reference to FIGS. 6 and 7.

Still referring to FIG. 9B, the assembly 900 can be constructed in the manner of the assembly of FIG. 8 such that the second section 904 and the third section 906 can include a joint or seal 804 that can be constructed in the manner of insert or seal 600 previously described in reference to FIG. 6. A second seal 805 (not shown) can also be disposed in the joint. Additionally, a passage 806 similar to the passage 606 previously described can be disposed to communicate in the volume defined between the second section 904, the third section 906, the second seal 805 (not shown) and the insert or seal 804. A connection 808 configured to connect with a leakage monitor as previously described in reference to FIG. 6 can communicate with the passage 806. The second seal 805 (not shown) can comprise a backup safety seal. The insert or seal 804 can comprise a thermal metal (as previously described) and can expand to exclude leakage in case of a fire or other high temperature event.

Figure 9D:
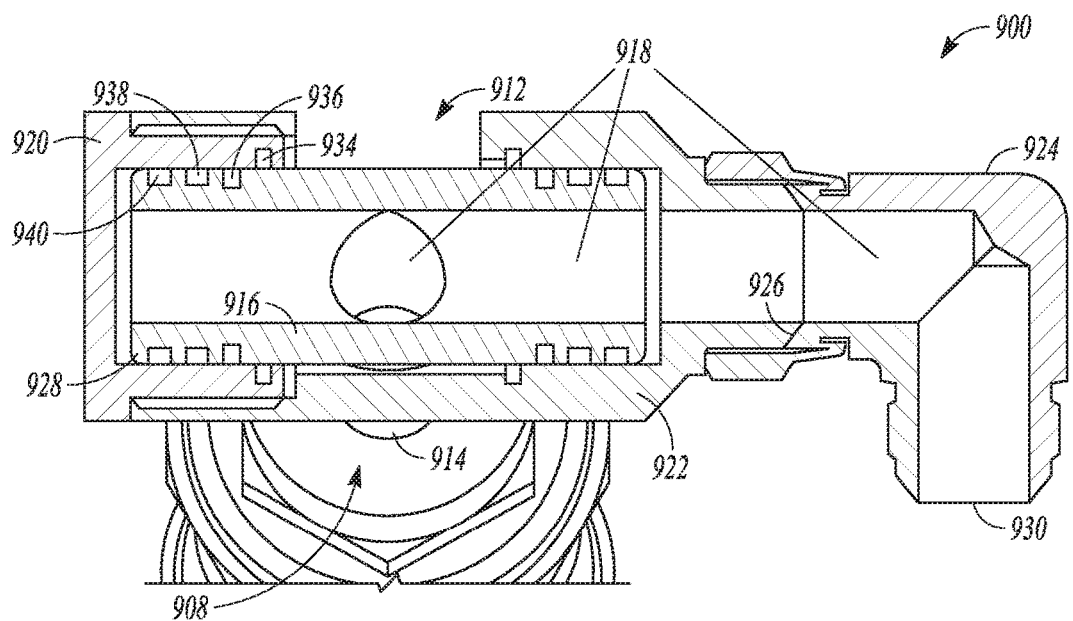
FIG. 9D is a cross-sectional view of the swivel assembly along D-D of FIG. 9C.

The assembly 900 differs from those of previous assemblies in that the fourth section 908 can moveably couple with the swivel assembly 910 at a T-joint 912 as shown in FIGS. 9A and 9D. In particular, the fourth section 908 can include a first portion 914 and a second portion 916 as shown in FIGS. 9B and 9D. The second portion 916 can be arranged at an angle relative to the first portion 914 such as a transverse angle as shown in FIGS. 9A, 9B and 9D. The swivel assembly 910 can be moveable about the second portion 916. As shown in FIGS. 9B and 9D a passage 918 can allow for communication of lubricant or other fluid through the fourth section 908 between the first portion 914 and the second portion 916.

As shown in FIG. 9D, the swivel assembly 910 can include several components including end piece 920, a sleeve 922 and an adapter 924. The sleeve 922 can be configured to receive and connect with the second portion 916 as well as portions of the end piece 920. The adapter 924 can connect with the sleeve 922 at a first end 926 thereof while the end piece 920 can be disposed at a second end 928 thereof. The adapter 924, sleeve 922 and the second portion 916 can form further lengths of the passage 918. The adapter 924 can be configured to turn the passage 918, and thus, can be configured to extend to have a first end 930 having an angle in two or three-dimensions relative to the first portion 914 and the second portion 916.

As shown in FIG. 9D, the coupling between the swivel assembly 910 and the fourth section 908 can necessitate the use of one or more seals 932. The one or more seals 932 can include a lip seal 934, a backup seal 936 and a primary seal 938, for example. A bearing ring 940 can also be used. The lip seal 934, the backup seal 936 and the primary seal 938 can be arranged between the end piece 920 and the second portion 916 according to the embodiment of FIG. 9D. Similarly, the bearing ring 940 can be disposed between the end piece 920 and the second portion 916.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A system of joints comprising:
   a first section configured to define a first passageway therein;
   a second section configured to define a second passageway, the second section and the first section together configured to form a first ball joint having an internal portion and an external portion, the first ball joint configured as a moveable coupling between second section and the first section when the second section and the first section are assembled together;
      a third section configured to define a third passageway, the third section configured to telescopically receive the second section therein and configured to form a linearly moveable joint between the third section and the second section when the third section and the second section are assembled together;
   at least six seals with at least at least three seals provided between each of the first section and the second section and the second section and the third section, wherein at least two of the at least six seals comprise polytetrafluoroethylene and bronze seals, at least one of the polytetrafluoroethylene and bronze seals disposed between each of the first section and the second section and the second section and the third section, and wherein the first section and the third section are configured such that each of the six seals is recessed from the second section when installed thereby allowing for a relative movement between the first section and the section and the second section and the third section; and
   a fourth section configured to define a fourth passageway, the fourth section and the third section together configured to form a moveable coupling between the fourth section and the third section when the fourth section and the third section are assembled together.

2. The system of claim 1, wherein one or more of the first section, the second section, the third section and the fourth section is configured to house a seal, wherein the seal is configured to allow for the passage of a portion of the fluid as a weep into a volume defined between at least the seal, the one or more of the first section, the second section, the third section and the fourth section and a second seal, and wherein the one or more of the first section, the second section, the third section and the fourth section is configured to define a passageway to drain the portion of the fluid from the volume.

3. The system of claim 2, further comprising a third seal disposed within a volume defined between at least the seal, the one or more of the first section, the second section, the third section and the fourth section and the second seal, the third seal configured to expand and contract in response to temperature to regulate the weep to the passageway to drain the portion of the fluid from the volume.

4. The system of claim 3, wherein the third seal is configured to expand in the event of a fire or another high temperature event that results in an elevated temperature to block or substantially restrict the weep to the passageway.

5. The system of claim 4, further comprising a second passageway having a connector configured to connect with a leakage monitor.

6. The system of claim 5, wherein the second passageway communicates with the volume between the third seal and the second seal.

7. The system of claim 1, further comprising a swivel assembly configured to moveably couple to the fourth section.

8. An assembly comprising:
   a first section defining a first passageway therein to receive and pass a fluid;
   a second section defining a second passageway that communicates with the first passageway, the second section and the first section together forming a first ball joint having an internal portion and an external portion, the first ball joint comprising a moveable coupling between second section and the first section;
   a third section defining a third passageway that communicates with the second passageway, the third section telescopically receiving the second section therein and configured to form a linearly moveable joint between the third section and the second section;
   a fourth section defining a fourth passageway that communicates with the third passageway, the fourth section and the third section together forming a t-joint having an internal portion and an external portion, the t-joint comprising a moveable coupling between the fourth section and the third section;
   a series of seals at the first ball joint, the series of seals between the internal portion and the external portion of the first ball joint, wherein the series of seals includes a first seal is configured to allow for the passage of a portion of the fluid as a weep into a first volume defined between at least the first seal, the first section, the second section and a second seal, and wherein the first section and the second section are configured to define a first passageway to drain the portion of the fluid from the first volume, wherein the portion of the fluid that flows into the first volume further weeps past the second seal and into a second volume defined between the second seal, the first section, the second section and a third seal, and wherein the third seal is configured to expand and contract in response to temperature to regulate the weep to a second passageway to drain the portion of the fluid from the second volume.

9. The assembly of claim 8, wherein the first seal comprises a polytetrafluoroethylene and bronze seal and the series of seals comprises at least three seals provided between each of the first section and the second section, the second section and the third section, and the third section and the fourth section.

10. The assembly of claim 8, wherein one or more of the first section that forms the first passageway and the fourth section that forms the fourth passageway has at least one flared end portion configured to form a portion of a curvature of the external portion of the first ball joint.

11. The assembly of claim 10, wherein the at least one flared end portion abuts a mating second flared portion of at least one of the second section and the third section at an interface, and wherein the interface allows a portion of the fluid to flow into the first volume defined between at least one of the internal portion and the external portion of the first ball joint.

12. The assembly of claim 11, wherein the first seal comprises a polytetrafluoroethylene and bronze seal and the series of seals are at least three seals provided between each of the first section and the second section, the second section and the third section, and the third section and the fourth section.

13. The assembly of claim 8, further comprising a circlip disposed between the second section and the third section, wherein the second section includes a flange projection received in a cavity of the third section and the circlip is configured to act as a stop to halt a movement of the flange projection out of the cavity.

14. The assembly of claim 8, wherein the assembly is configured such that each seal is recessed in one or more of the first section, the second section, the third section and the fourth section, the assembly with each seal recessed allowing for a relative movement between the first section and the second section, the second section and the third section, and the third section and the fourth section.

15. The assembly of claim 8, further comprising a flange configured to abut and be fastened to one or more of the first section and the fourth section, the flange configured to form a part of the external portion of the first ball joint, wherein the flange is configured to house at least two seals in grooves therein and is configured to interface with one or more of the second section and the third section.

16. The assembly of claim 8, wherein the third seal is configured to expand in the event of a fire or another high temperature event that results in an elevated temperature to block or substantially restrict the weep to the passageway.

17. The assembly of claim 8, wherein the second passageway has a connector configured to connect with a leakage monitor.

18. The assembly of claim 17, wherein the second passageway communicates with the second volume between the third seal and the second seal.

19. The assembly of claim 8, further comprising a swivel assembly configured to moveably couple to the fourth section.

* * * * *

UNITED STATES PATENT AND TRADEMARK OFFICE
CERTIFICATE OF CORRECTION

| | |
|---|---|
| PATENT NO. | : 10,774,966 B2 |
| APPLICATION NO. | : 15/654418 |
| DATED | : September 15, 2020 |
| INVENTOR(S) | : Norman Ian Mathers |

Page 1 of 1

It is certified that error appears in the above-identified patent and that said Letters Patent is hereby corrected as shown below:

In the Claims

In Column 15, Line 57, in Claim 1, delete "at least at least" and insert --at least-- therefor In Column 16, Line 2, in Claim 1, delete "and the section" and insert --and the second section,-- therefor Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*